United States Patent
Mohanty et al.

(10) Patent No.: US 8,891,387 B2
(45) Date of Patent: Nov. 18, 2014

(54) UE BASED CONDITIONAL ENABLING OF ULTD

(75) Inventors: Bibhu Prasad Mohanty, San Diego, CA (US); Sharad Deepak Sambhwani, San Diego, CA (US); Chengjin Zhang, San Diego, CA (US); Daniel F. Filipovic, Solana Beach, CA (US); Ravi Agarwal, San Diego, CA (US); Jilei Hou, San Diego, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 13/098,231

(22) Filed: Apr. 29, 2011

(65) Prior Publication Data

US 2011/0286347 A1 Nov. 24, 2011

Related U.S. Application Data

(60) Provisional application No. 61/330,870, filed on May 3, 2010.

(51) Int. Cl.
*H04W 4/00* (2009.01)
*H04W 24/00* (2009.01)
*H04B 7/06* (2006.01)

(52) U.S. Cl.
CPC ............ *H04B 7/0689* (2013.01); *H04B 7/0617* (2013.01); *H04B 7/0602* (2013.01)
USPC ............... 370/252; 370/329; 370/341

(58) Field of Classification Search
None
See application file for complete search history.

(56) References Cited

U.S. PATENT DOCUMENTS

| 6,141,542 | A | 10/2000 | Kotzin et al. |
| 2004/0147234 | A1 | 7/2004 | Lin et al. |
| 2006/0172781 | A1* | 8/2006 | Mohebbi ................ 455/571 |
| 2007/0041471 | A1* | 2/2007 | Roh et al. .............. 375/299 |

(Continued)

FOREIGN PATENT DOCUMENTS

| CN | 1795687 A | 6/2006 |
| EP | 1133080 A1 | 9/2001 |

(Continued)

OTHER PUBLICATIONS

Jiang, Yibo, et al.; "Uplink Closed Loop Transmit Diversity for HSPA"; Qualcomm Inc, Jan. 24, 2011.

(Continued)

*Primary Examiner* — Chi Pham
*Assistant Examiner* — Soon-Dong D Hyun

(57) ABSTRACT

In a communication system, user equipment (UE) conditionally performs uplink transmit diversity (ULTD) either by Switched Antenna Transmit Diversity (SATD) or Beamforming Transmit Diversity (BFTD) using a first antenna and a second antenna. Either a serving node or the UE determines that uplink transmit diversity is conditionally authorized. Either a serving node or the UE measures a value. The UE transmits using ULTD in response to determining that an enabling condition based on the value is satisfied. The UE can also disable uplink transmit diversity in response to determining that a disabling condition based on the value is satisfied. The disabling condition comprises a disabling threshold that equals the enabling condition comprising an enabling threshold with a threshold adjustment for hysteresis.

29 Claims, 10 Drawing Sheets

(56) References Cited

U.S. PATENT DOCUMENTS

| | | | |
|---|---|---|---|
| 2008/0123768 A1* | 5/2008 | Harel et al. | 375/267 |
| 2008/0130508 A1* | 6/2008 | Vikstedt et al. | 370/241 |
| 2008/0151798 A1 | 6/2008 | Camp | |
| 2009/0233571 A1 | 9/2009 | Okumura | |
| 2010/0056074 A1* | 3/2010 | Higuchi et al. | 455/77 |
| 2010/0080136 A1 | 4/2010 | Hunzinger | |
| 2011/0103273 A1* | 5/2011 | Dutta | 370/281 |
| 2011/0136446 A1* | 6/2011 | Komninakis et al. | 455/78 |
| 2012/0002630 A1* | 1/2012 | Bergman et al. | 370/329 |
| 2012/0082192 A1* | 4/2012 | Pelletier et al. | 375/219 |
| 2012/0195224 A1* | 8/2012 | Kazmi et al. | 370/252 |

FOREIGN PATENT DOCUMENTS

| | | |
|---|---|---|
| JP | 2010514367 A | 4/2010 |
| WO | 9854867 A1 | 12/1998 |
| WO | 0011806 A1 | 3/2000 |
| WO | 2008079455 A1 | 7/2008 |
| WO | WO2010145615 | 12/2010 |

OTHER PUBLICATIONS

Ericsson et al: "Some considerations on UL Tx Diversity for HSUPA", 3GPP Draft: R1-101304, 3rd Generation Partnership Project (3GPP), Mobile Competence Center ; 650, Route Des Lucioles ; F-06921 Sophia-Antipolis Cedex ; France, vol. RAN WG1, No. San Francisco, USA; 20100222, Feb. 16, 2010, XP050418804, p. 2, lines 31-41 p. 1.

International Search Report and Written Opinion—PCT/US2011/035071—ISA/EPO—Dec. 1, 2011.

3GPP, "Uplink Tx Diversity for HSPA", Vodafone, Orange, Telecom Italia, Magnolia Broadband, AT&T, Qualcomm Europe, Deutsche Telekom, ZTE, pp. 5.

Qualcomm Incorporated, "Impact of Switched Antenna Tx diversity on existing UE core Tx requirements", 3GPP TSG-WG4 Meeting #55, Montreal, Quebec, Canada, May 10-14, 2010, pp. 1-3.

Qualcomm Incorporated, "RAN4 related 25.863 TR Skeleton for UL Transmit Diversity", 3GPP TSG-RAN WG4 Meeting #54, San Francisco, USA, Feb. 22-26, 2010, p. 1.

TSG RAN WG1, "LS on RAN1 Findings on UL Transmit Diversity for HSPA and TP to 25.863 TR", 3GPP TSG-RAN-WG1 Meeting #60bis, Beijing, China, Apr. 12-16, 2010, pp. 1-2.

* cited by examiner

UE BASED CONDITIONAL ENABLING OF ULTD

CLAIM OF PRIORITY UNDER 35 U.S.C. §119

The present Application for Patent claims priority to Provisional Application No. 61/330,870 entitled "UE Based Conditional Enabling of ULTD" filed May 3, 2010, and assigned to the assignee hereof and hereby expressly incorporated by reference herein.

BACKGROUND

The present disclosure relates generally to communication, and more specifically to techniques for uplink transmit diversity in a wireless communication network.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Universal Mobile Telecommunications System (UMTS) is one of the third-generation (3G) cell phone technologies. UTRAN, short for UMTS Terrestrial Radio Access Network, is a collective term for the Node-Bs and Radio Network Controllers which make up the UMTS radio access network. This communications network can carry many traffic types from real-time Circuit Switched to IP-based Packet Switched. The UTRAN allows connectivity between the UE (user equipment) and the core network. The UTRAN contains the base stations, which are called Node Bs, and Radio Network Controllers (RNC). The RNC provides control functionalities for one or more Node Bs. A Node B and an RNC can be the same device, although typical implementations have a separate RNC located in a central office serving multiple Node Bs. Despite the fact that they do not have to be physically separated, there is a logical interface between them known as the Iub. The RNC and its corresponding Node Bs are called the Radio Network Subsystem (RNS). There can be more than one RNS present in an UTRAN.

CDMA2000 (also known as IMT Multi Carrier (IMT MC)) is a family of 3G mobile technology standards, which use CDMA channel access, to send voice, data, and signaling data between mobile phones and cell sites. The set of standards includes: CDMA2000 1X, CDMA2000 EV-DO Rev. 0, CDMA2000 EV-DO Rev. A, and CDMA2000 EV-DO Rev. B. All are approved radio interfaces for the ITU's IMT-2000. CDMA2000 has a relatively long technical history and is backward-compatible with its previous 2G iteration IS-95 (cdmaOne).

CDMA2000 1X (IS-2000), also known as 1x and 1xRTT, is the core CDMA2000 wireless air interface standard. The designation "1x", meaning 1 times Radio Transmission Technology, indicates the same RF bandwidth as IS-95: a duplex pair of 1.25 MHz radio channels. 1xRTT almost doubles the capacity of IS-95 by adding 64 more traffic channels to the forward link, orthogonal to (in quadrature with) the original set of 64. The 1X standard supports packet data speeds of up to 153 kbps with real world data transmission averaging 60-100 kbps in most commercial applications. IMT-2000 also made changes to the data link layer for the greater use of data services, including medium and link access control protocols and Quality of Service (QoS). The IS-95 data link layer only provided "best effort delivery" for data and circuit switched channel for voice (i.e., a voice frame once every 20 ms).

CDMA2000 1xEV-DO (Evolution-Data Optimized), often abbreviated as EV-DO or EV, is a telecommunications standard for the wireless transmission of data through radio signals, typically for broadband Internet access. It uses multiplexing techniques including code division multiple access (CDMA) as well as time division multiple access (TDMA) to maximize both individual user's throughput and the overall system throughput. It is standardized by 3rd Generation Partnership Project 2 (3GPP2) as part of the CDMA2000 family of standards and has been adopted by many mobile phone service providers around the world, particularly those previously employing CDMA networks.

3GPP LTE (Long Term Evolution) is the name given to a project within the Third Generation Partnership Project (3GPP) to improve the UMTS mobile phone standard to cope with future requirements. Goals include improving efficiency, lowering costs, improving services, making use of new spectrum opportunities, and better integration with other open standards. The LTE system is described in the Evolved UTRA (EUTRA) and Evolved UTRAN (EUTRAN) series of specifications.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In one aspect, the present disclosure provides a method for uplink transmit diversity by transmitting an uplink on a first antenna of user equipment, determining that uplink transmit diversity is conditionally authorized, measuring a value, and transmitting the uplink, at least in part, on a second antenna of the user equipment for uplink transmit diversity in response to determining that an enabling condition based on the value is satisfied.

In another aspect, the present disclosure provides at least one processor for uplink transmit diversity. A first module transmits an uplink on a first antenna of user equipment. A second module determines that uplink transmit diversity is conditionally authorized. A third module measures a value. A fourth module transmits the uplink at least in part on a second antenna of the user equipment for uplink transmit diversity in response to determining that an enabling condition based on the value is satisfied.

In an additional aspect, the present disclosure provides a computer program product for uplink transmit diversity. A non-transitory computer readable storage medium stores sets of codes. A first set of codes causes a computer to transmit an uplink on a first antenna of user equipment. A second set of codes causes the computer to determine that uplink transmit diversity is conditionally authorized. A third set of codes causes the computer to measure a value. A fourth set of codes causes the computer to transmit the uplink, at least in part, on a second antenna of the user equipment for uplink transmit diversity in response to determining that an enabling condition based on the value is satisfied.

In a further aspect, the present disclosure provides an apparatus for uplink transmit diversity. The apparatus comprises means for transmitting an uplink on a first antenna of user equipment. The apparatus comprises means for determining that uplink transmit diversity is conditionally authorized. The apparatus comprises means for measuring a value. The apparatus comprises means for transmitting the uplink, at least in part, on a second antenna of the user equipment for uplink transmit diversity in response to determining that an enabling condition based on the value is satisfied.

In yet another aspect, the present disclosure provides an apparatus for uplink transmit diversity. A transmitter transmits an uplink on a first antenna of user equipment. An uplink transmit diversity controller determines that uplink transmit diversity is conditionally authorized. A receiver measures a value. The transmitter further transmits the uplink, at least in part, on a second antenna of the user equipment for uplink transmit diversity in response to the uplink transmit diversity controller for determining that an enabling condition based on the value is satisfied.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
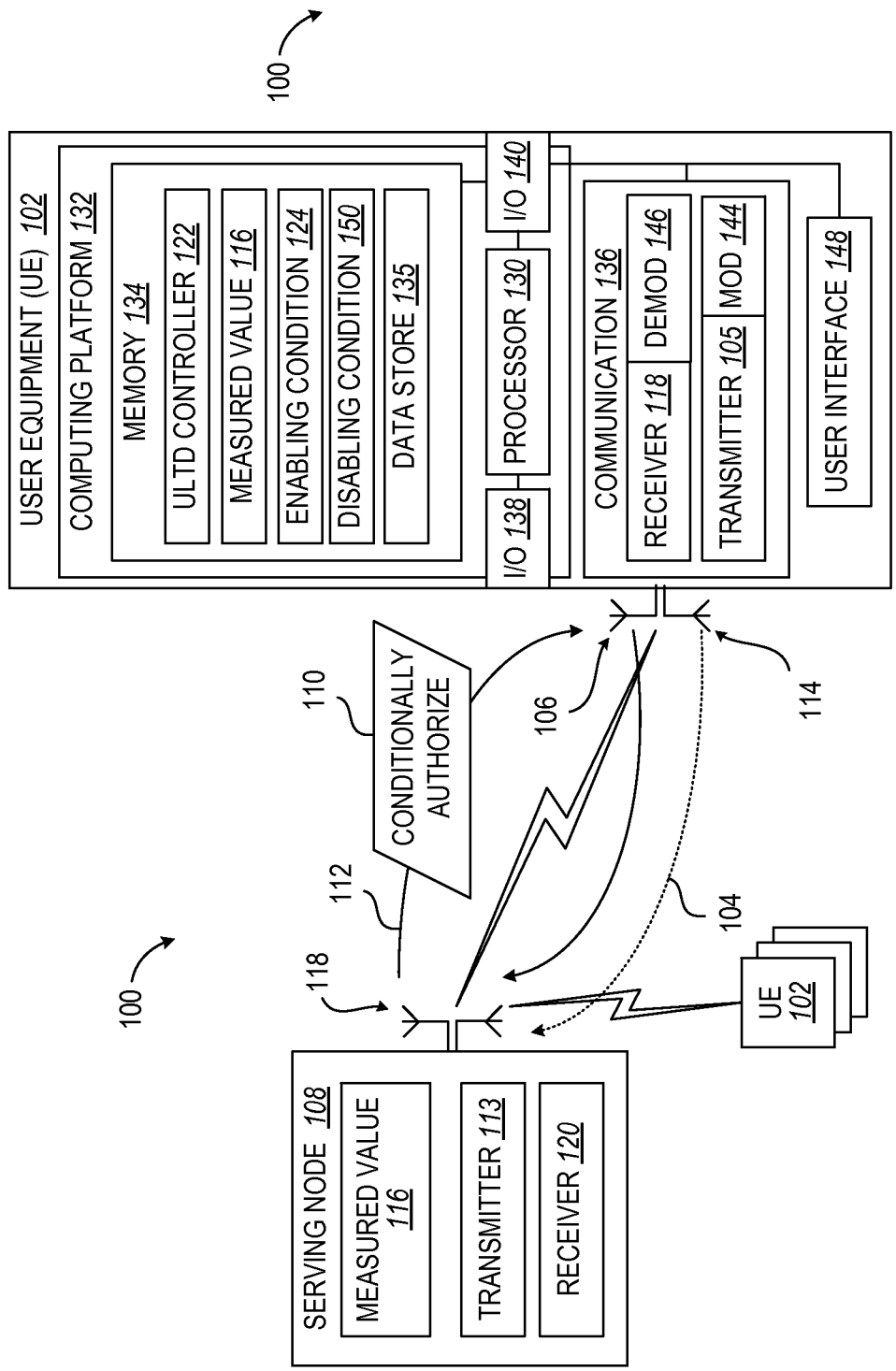
FIG. 1 is a schematic diagram of a communication system for conditionally performing uplink transmit diversity (ULTD)

In a communication system, user equipment (UE) conditionally performs uplink transmit diversity (ULTD) either by Switched Antenna Transmit Diversity (SATD) or Beamforming Transmit Diversity (BFTD) using a first antenna and a second antenna. Either a serving node or the UE determines that uplink transmit diversity is conditionally authorized. Either a serving node or the UE measures a value. The UE transmits using ULTD in response to determining that an enabling condition based on the value is satisfied. The UE can also disable uplink transmit diversity in response to determining that a disabling condition based on the value is satisfied. The disabling condition comprises a disabling threshold that equals the enabling condition comprising an enabling threshold with a threshold adjustment for hysteresis.

For instance, SATD can be prevented from switching too quickly or to be used at all if the UE is configured for Dual Carrier High-Speed Uplink Packet Access (DC-HSUPA). In other aspects, an enabling threshold and a disabling threshold can be based upon power headroom, an active set size, Common Pilot Channel (CPICH) Received Signal Code Power (RSCP), Universal Mobile Telecommunications System (UMTS) Terrestrial Radio Access (UTRA) carrier Received Signal Strength Indication (RSSI), Chip Energy divided by Noise Density (Ec/No) of a downlink from a serving node, transmit power by the UE, speed of the UE, distance of the UE from a serving node, average data rate transmitted by the UE, duration of a Radio Resource Management (RRM) operation, duration of an interference management operation, a traffic characteristic of a served plurality of UEs, and a number of antenna switches within a selected amount of time.

In one aspect, SATD is disabled when DC-HSUPA is configured. Conventionally, the UL Tx Diversity for HSPA has been limited to operation of a single uplink frequency. If ULTD were to be enabled when dual carrier HSUPA (DC-HSUPA) is configured, depending on the assumed UE transmit architecture, there may be a need to define new methods for both Beamforming Transmit Diversity (BFTD) and SATD. In one example, DC-HSUPA and ULTD may be combined. ULTD may be restricted to single uplink frequency operation. In one example, testing may be introduced to ensure that the UE has disabled ULTD when DC-HSUPA is configured. In another example, for a SATD capable UE, SATD is disabled when DC-HSUPA is configured.

In another aspect, UE-based conditional enabling of ULTD can be implemented. Uplink transmit diversity (ULTD) schemes employ more than one transmit antenna (usually two) at the UE to improve the uplink transmission performance, e.g., reduce the user equipment (UE) transmit power, or increase the UE coverage range, or increase the UE data rate, or the combination of the above. It can also help improve the overall system capacity. Based on the feedback requirements, ULTD schemes can be categorized into closed-loop (CL) and open-loop (OL) schemes. From the transmitter perspective, ULTD schemes can be classified as beamforming (BF) and antenna switching (AS) schemes.

In general, in closed-loop (CL) transmit diversity (TD) schemes the receiver provides explicit feedback information about the spatial channel to assist the transmitter in choosing a transmission format over multiple transmit antennas. On the other hand, open-loop (OL) TD schemes do not. In the context of the W-CDMA uplink, the term OL TD schemes includes the schemes without core standards change, i.e., without introducing new feedback channels.

There are two categories of CLTD schemes. In the CLTD beamforming scheme, the Node B feeds back to the UE a precoding (or beamforming) vector to be used over multiple transmit antennas so that the signals received at the Node B are constructively added. This in turn maximizes the receiver signal to noise ratio (SNR) and achieves the beamforming effect. In the CLTD antenna switching scheme, the Node B feeds back to the UE its choice on which transmit antenna the UE should use. This choice results in the largest channel gain between the UE transmit antenna and the Node B receive antennas. Between the two schemes, CLTD BF can achieve a better tradeoff between how fast to track the channel versus how often the scheme may disrupt the channel phase.

Higher layer signaling may be introduced to enable or disable the uplink transmit diversity transmission to mitigate some potential performance concerns.

If higher layer control is used, the UE may be allowed to enable the ULTD feature based on some measurements or conditions at the UE managed by the network. Many of these measurements or conditions may be part of a set used by an ULTD method. This allows not only higher layer signaling to enable/disable the feature, but also adds a finer degree of control over when the feature may be exercised. Conditionally enabling and disabling ULTD at the UE via network control based on some suitable UE measurements may be advantageous.

Conventionally, open loop uplink transmit diversity (OL ULTD) algorithms could potentially cause some system performance impact to network operation and the impact could be emphasized if OL ULTD were enabled all the time. Instead of enabling ULTD all the time, the present method and apparatus discloses a set of triggers that can be used at both the Node B and UE to conditionally enable/disable ULTD based on a set of triggers. Allowing for conditional enabling/disabling of the ULTD method and apparatus may mitigate the risk of system impact to W-CDMA/HSUPA network operation by ensuring that not every UE is performing ULTD at any given time.

A list of possible triggers for enabling ULTD could be as follows:

UE's power headroom becomes less than a configurable threshold;

UE's Active Set Size>1;

CPICH RSCP from serving cell measured at the UE becomes less than a threshold;

UTRA Carrier RSSI measured at the UE becomes less than a threshold;

CPICH Ec/No from serving cell measured at the UE becomes less than a threshold, wherein Ec/No (Chip Energy divided by Noise Density), is the Received Signal Code Power (RSCP) divided by the Received Signal Strength Indicator (RSSI); and in the case where only R99 DCH is configured, UE transmitted power exceeds a threshold.

A list of possible triggers for disabling ULTD could be as follows:

UE's power headroom becomes greater than a configurable threshold;

UE's Active Set Size=1;

CPICH RSCP from serving cell measured at the UE becomes greater than a threshold;

UTRA Carrier RSSI measured at the UE becomes greater than a threshold;

CPICH Ec/No from serving cell measured at the UE becomes greater than a threshold; and In the case where only R99 DCH is configured, UE transmitted power becomes less than a threshold.

Note that the thresholds for enabling ULTD could be in general different than the thresholds for disabling ULTD to allow for a hysteresis. Also, another useful trigger that can be used within the network is the RX Ecp/Nt (ratio of a pilot signal amplitude to a noise level) at the Node B side. If that is above a certain threshold, the UE could be signaled to turn off ULTD.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

With initial reference to FIG. 1, in a communication system 100, an apparatus, depicted as user equipment 102, transmits an uplink 104 using a transmitter 105 and a first antenna 106 to a serving node 108. The serving node 108 can conditionally authorize (block 110) the user equipment 102 by transmitting on a downlink 112 to perform uplink transmit diversity (ULTD) via transmitter 113. Thus, the user equipment 102 can also use a second antenna 114 for Switched Antenna Transmit Diversity (SATD) or Beamforming Transmit Diversity (BFTD). Either the user equipment 102 or the serving node 108 measures a value 116 that is received by respective receivers 118, 120. An uplink transmit diversity (ULTD) controller 122 determines that an enabling condition 124 based on the value 116 is satisfied and enables the transmitter 105 to transmit the uplink 104 using ULTD on the first antenna 106 and the second antenna 114.

With continuing reference to FIG. 1, in one aspect, user equipment 102 may include a processor 130 for carrying out processing functions associated with one or more of components and functions described herein. Processor 130 can include a single or multiple set of processors or multi-core processors as part. Moreover, processor 130 can be implemented as an integrated processing system and/or a distributed processing system, depicted as a computing platform 132.

User equipment 102 further includes a memory 134, such as for storing local versions of applications being executed by processor 130. Memory 134 can include any type of memory usable by a computer, such as random access memory (RAM), read only memory (ROM), tapes, magnetic discs, optical discs, volatile memory, non-volatile memory, and any combination thereof. For instance, the memory 134 can at least in part comprise a data store 135, which can be any suitable combination of hardware and/or software, that provides for mass storage of information, databases, and programs employed in connection with aspects described herein. For example, data store 135 may be a data repository for applications not currently being executed by processor 130.

Further, user equipment 102 includes a communications component 136 that provides for establishing and maintaining communications with one or more parties utilizing hardware, software, and services as described herein. Communications component 136 may carry communications between components on user equipment 102, as well as between user equipment 102 and external devices, such as devices located across a communications network via an external input/output (I/O) interface 138 or devices serially or locally connected to user equipment 102 via an internal bus interface 140. For example, communications component 136 may include one or more buses 142, and may further include transmit chain components and receive chain components, for clarity depicted as a modulator 144, the transmitter 105 and transmit antenna(s) (first antenna 106 and second antenna 114) for the transmit chain and receive antennas (first antenna 106 and second antenna 114), receiver 118, and demodulator 146 for the receive chain.

User equipment 102 may additionally include a user interface 148 operable to receive inputs from a user of user equipment 102 and further operable to generate outputs for presentation to the user. User interface 148 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface 148 may include one or more output devices, including but not limited to a display, a speaker, a haptic feedback mechanism, a printer, any other mechanism capable of presenting an output to a user, or any combination thereof.

Resident in memory 134, data store 135 or both, the user equipment 102 can incorporate the ULTD controller 122, measured value 116, and enabling condition 124. A disabling condition 150 can also reside in memory 134, such as a disabling threshold offset for hysteresis from an enabling threshold for the measured value 116.

Figure 2:
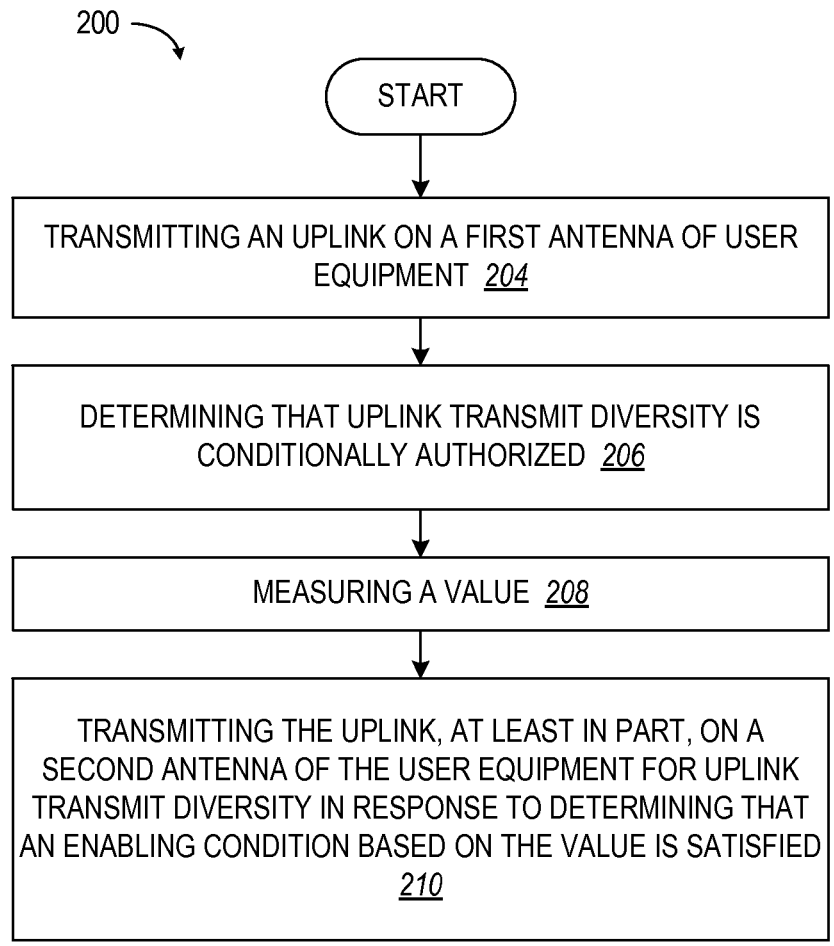
FIG. 2 is a flowchart containing steps executed when using measurements to trigger enabling/disabling of the ULTD.

In FIG. 2, the present disclosure provides a method for uplink transmit diversity, such as by either Switched Antenna Transmit Diversity (SATD) Beamforming Transmit Diversity (BFTD). User equipment transmits an uplink on a first antenna (block 204). A determination is made by either a serving node or the user equipment that uplink transmit diversity is conditionally authorized (block 206). A value is measured by either the serving node or the user equipment (block 208). The user equipment transmits the uplink, at least in part, on a second antenna of the user equipment for uplink transmit diversity in response to determining that an enabling condition based on the value is satisfied (block 210).

In one aspect in using SATD, the method 200 can further provide for measuring the value of time elapsed since switching between transmitting on the first antenna and the second antenna and enabling switching between the first antenna and the second antenna in response to comparing the value of time elapsed to the enabling condition of a minimum elapsed time threshold, which can be a configurable value.

In another example, disabling switching between the first antenna and the second antenna for SATD can be in response to determining that the user equipment is configured for Dual Carrier High-Speed Uplink Packet Access (DC-HSUPA).

In an additional example, determining that the enabling condition based on the value is satisfied further comprises comparing the value of power headroom of the user equipment to an enabling threshold.

In a further aspect, comparing the enabling condition based on the value is satisfied further comprises comparing the value of an active set size of the user equipment to an active set threshold. For example, the active set threshold is one (1).

In yet another aspect, determining that the enabling condition based on the value is satisfied further comprises comparing the value of Common Pilot Channel (CPICH) Received Signal Code Power (RSCP) to an enabling threshold.

In yet an additional aspect, determining that the enabling condition based on the value is satisfied further comprises comparing the value of Universal Mobile Telecommunications System (UMTS) Terrestrial Radio Access (UTRA) carrier Received Signal Strength Indication (RSSI) to an enabling threshold.

In yet a further aspect, determining that the enabling condition based on the value is satisfied further comprises comparing the value of Chip Energy divided by Noise Density (Ec/No) of a downlink from a serving node to an enabling threshold.

In another aspect, determining that the enabling condition based on the value is satisfied further comprises comparing the value of transmit power by the user equipment to an enabling threshold. In an exemplary aspect, determining that the enabling condition is satisfied further comprises determining that only a Release 1999 Dedicated Channel (DCH) is configured on the user equipment.

In an additional aspect, determining that the enabling condition based on the value is satisfied further comprises comparing the value comprising speed of the user equipment to an enabling threshold.

In a further aspect, determining that the enabling condition based on the value is satisfied further comprises comparing the value comprising distance of the user equipment from a serving node to an enabling threshold.

In yet another aspect, determining that the enabling condition based on the value is satisfied further comprises comparing the value comprising an average data rate transmitted by the user equipment to an enabling threshold.

In yet an additional aspect, determining that the enabling condition based on the value is satisfied further comprises comparing the value comprising duration of a Radio Resource Management (RRM) operation to an enabling threshold.

In yet a further aspect, determining that the enabling condition based on the value is satisfied further comprises comparing the value comprising duration of an interference management operation to an enabling threshold.

In another aspect, determining that the enabling condition based on the value is satisfied further comprises comparing the value comprising a traffic characteristic of a served plurality of user equipment to an enabling threshold.

In an additional aspect, determining that the enabling condition is satisfied further comprises comparing the value comprising a number of antenna switches within a selected amount of time to an enabling threshold.

In a further aspect, the method further provides for disabling uplink transmit diversity in response to determining that a disabling condition based on the value is satisfied. The disabling condition comprises a disabling threshold that equals the enabling condition comprising an enabling threshold with a threshold adjustment for hysteresis.

Further described herein with reference to FIGS. 3-6 is an example of a radio network operating according to Universal Mobile Telecommunications System (UMTS) in which the principles of the disclosure may be applied. Base nodes (Node Bs 310, 311, 314) and radio network controllers 341-344 are parts of a network called a "radio network," "RN," "access network (AN)." The radio network may be a UMTS Terrestrial Radio Access Network (UTRAN). A UMTS Terrestrial Radio Access Network (UTRAN) is a collective term for the Node Bs (or base stations) and the control equipment for the Node Bs (or radio network controllers (RNC)) it contains which make up the UMTS radio access network. This is a 3G communications network which can carry both real-time circuit switched and IP-based packet-switched traffic types. The UTRAN provides an air interface access method for the user equipment (UE) 323-327. Connectivity is provided between the UE (user equipment) and the core network by the UTRAN. The radio network may transport data packets between multiple user equipment devices 323-327.

Figure 3:
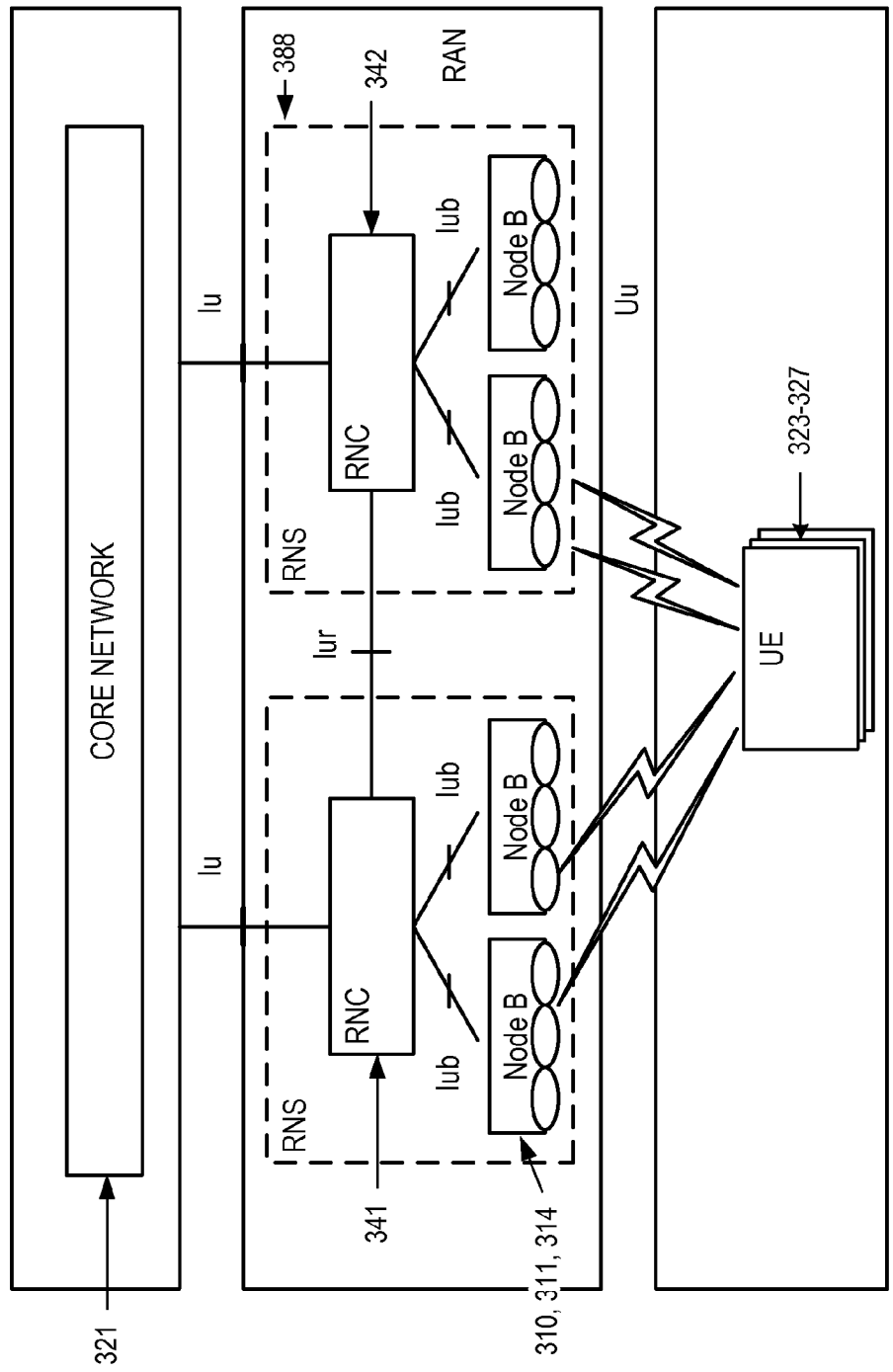
FIG. 3 is a block diagram of a radio access system having two radio network subsystems along with its interfaces to the core and the user equipment.

The UTRAN is connected internally or externally to other functional entities by four interfaces: Iu, Uu, Iub and Iur. The UTRAN is attached to a GSM core network 321 via an external interface called Iu. Radio network controller (RNC) 341-344 (shown in FIG. 4), of which RNCs 341, 342 are shown in FIG. 3, supports this interface. In addition, the RNCs 341-344 manage a set of base stations called Node Bs through interfaces labeled Iub. The Iur interface connects the two RNCs 341-342 with each other. The UTRAN is largely autonomous from the core network 321 since the RNCs 341-344 are interconnected by the Iur interface. FIG. 3 discloses a communication system which uses the RNC, the Node Bs and the Iu and Uu interfaces. The Uu is also external and connects the Node Bs 310, 311, 314 with the UE 323-327, while the Iub is an internal interface connecting the RNC 342-344 with the Node Bs 310, 311, 314.

The radio network may be further connected to additional networks outside the radio network, such as a corporate intranet, the Internet, or a conventional public switched telephone network as stated above, and may transport data packets between each user equipment device 323-327 and such outside networks.

Figure 4:
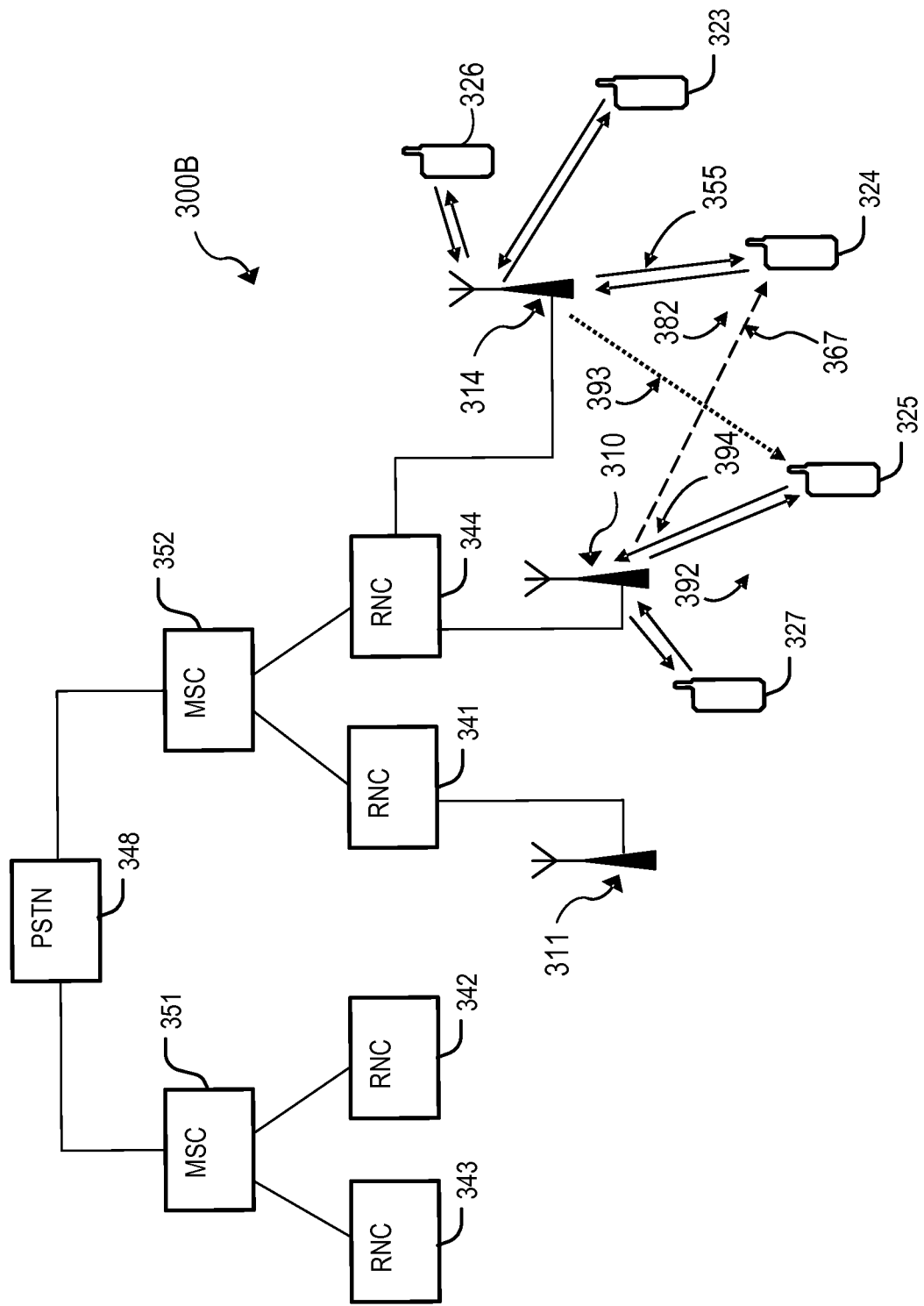
FIG. 4 is a simplified representation of a cellular communications system.

FIG. 4 illustrates selected components of a communication network 300, which includes radio network controller (RNC) (or base station controllers (BSC)) 341-344 coupled to Node Bs 310, 311, and 314 (or base stations or wireless base transceiver stations). The Node Bs 310, 311, 314 communicate with user equipment (or remote stations) 323-327 through corresponding wireless connections 355, 367, 382, 392, 393, 394. A communications channel includes a forward link (FL) (also known as a downlink) for transmissions from the Node B 310, 311, 314 to the user equipment (UE) 323-327, and a reverse link (RL) (also known as an uplink) for transmissions from the UE 323-327 to the Node B 310, 311, 314. The RNCs 341-344 provides control functionalities for one or more Node Bs. The radio network controllers 341-344 are coupled to a public switched telephone network (PSTN) 348 through mobile switching centers (MSC) 351, 352. In another example, the radio network controllers 341-344 are coupled to a packet switched network (PSN) (not shown) through a packet data server node (PDSN) (not shown). Data interchange between various network elements, such as the radio network controllers 341-344 and a packet data server node, can be implemented using any number of protocols, for example, the Internet Protocol (IP), an asynchronous transfer mode (ATM) protocol, T1, E1, frame relay, or other protocols.

Each RNC fills multiple roles. First, it may control the admission of new mobiles or services attempting to use the Node B. Second, from the Node B, or base station, point of view, the RNC is a controlling RNC. Controlling admission ensures that mobiles are allocated radio resources (bandwidth and signal/noise ratio) up to what the network has available. The RNC is where the Node Bs Iub interface terminates. From the UE, or mobile, point of view, the RNC acts as a serving RNC in which it terminates the mobile's link layer communications. From a core network point of view, the serving RNC terminates the Iu for the UE. The serving RNC also controls the admission of new mobiles or services attempting to use the core network over its Iu interface.

W-CDMA: For an air interface, UMTS most commonly uses a wideband spread-spectrum mobile air interface known as wideband code division multiple access (or W-CDMA). W-CDMA uses a direct sequence code division multiple access signaling method (or CDMA) to separate users. W-CDMA (Wideband Code Division Multiple Access) is a third generation standard for mobile communications. W-CDMA evolved from GSM (Global System for Mobile Communications)/GPRS (General Packet Radio Service) a second generation standard, which is oriented to voice communications with limited data capability. The first commercial deployments of W-CDMA are based on a version of the standards called W-CDMA Release 99.

The Release 99 specification defines two techniques to enable uplink packet data. Most commonly, data transmission is supported using either the Dedicated Channel (DCH) or the Random Access Channel (RACH). However, the DCH is the primary channel for support of packet data services. Each remote station (user equipment 323-327) uses an orthogonal variable spreading factor (OVSF) code. An OVSF code is an orthogonal code that facilitates uniquely identifying individual communication channels. In addition, micro diversity is supported using soft handover and closed loop power control is employed with the DCH.

Pseudorandom noise (PN) sequences are commonly used in CDMA systems for spreading transmitted data, including transmitted pilot signals. The time required to transmit a single value of the PN sequence is known as a chip, and the rate at which the chips vary is known as the chip rate. Inherent in the design of direct sequence CDMA systems is a receiver that aligns its PN sequences to those of the Node B 310, 311, 314. Some systems, such as those defined by the W-CDMA standard, differentiate base stations (Node Bs 310, 311, 314) using a unique PN code for each, known as a primary scrambling code. The W-CDMA standard defines two Gold code sequences for scrambling the downlink, one for the in-phase component (I) and another for the quadrature (Q). The I and Q PN sequences together are broadcast throughout the cell without data modulation. This broadcast is referred to as the common pilot channel (CPICH). The PN sequences generated are truncated to a length of 38,400 chips. The period of 38,400 chips is referred to as a radio frame. Each radio frame is divided into thirty-five (35) equal sections referred to as slots. Node Bs 310, 311, 314 that are W-CDMA operate asynchronously in relation to each other, so knowledge of the frame timing of one base station (Node B 310, 311, 314) does not translate into knowledge of the frame timing of any other Node B 310, 311, 314. In order to acquire this knowledge, W-CDMA systems uses synchronization channels and a cell searching technique.

HSPA (High-Speed Packet Access): 3GPP Release 5 and later supports High-Speed Downlink Packet Access (HSDPA). 3GPP Release 6 and later supports High-Speed Uplink Packet Access (HSUPA). HSDPA and HSUPA are sets of channels and procedures that enable high-speed packet data transmission on the downlink and uplink, respectively. Release 7 HSPA+ uses three enhancements to improve data rate. First, it introduced support for 2×2 multiple-in-multiple-out (MIMO) on the downlink. With MIMO, the peak data rate supported on the downlink is 28 Mbps. Second, higher order modulation is introduced on the downlink. The use of sixty-four (64) Quadrature Amplitude Modulation (QAM) on the downlink allows peak data rates of 21 Mbps. Third, higher order modulation is introduced on the uplink. The use of 16 QAM on the uplink allows peak data rates of 11 Mbps (Megabits per second).

In HSUPA, the Node B 310, 311, 314 allows several user equipment devices 323-327 to transmit at a certain power level at the same time. These grants are assigned to users by using a fast scheduling algorithm that allocates the resources on a short-term basis (every tens of ms). The rapid scheduling of HSUPA is well suited to the bursty nature of packet data.

During periods of high activity, a user may get a larger percentage of the available resources, while getting little or no bandwidth during periods of low activity.

In 3GPP Release 5 HSDPA, a base transceiver station (Node B 310, 311, 314) of an access network sends downlink payload data to user equipment devices 323-327 on High Speed Downlink Shared Channel (HS-DSCH), and the control information associated with the downlink data on High Speed Shared Control Channel (HS-SCCH). There are 256 Orthogonal Variable Spreading Factor (OVSF or Walsh) codes used for data transmission. In HSDPA systems, these codes are partitioned into release 1999 (legacy system) codes that are typically used for cellular telephony (voice), and HSDPA codes that are used for data services. For each transmission time interval (TTI), the dedicated control information sent to an HSDPA-enabled user equipment device 323-327 indicates to the device which codes within the code space will be used to send downlink payload data to the device, and the modulation that will be used for transmission of the downlink payload data.

With HSDPA operation, downlink transmissions to the user equipment devices 323-327 may be scheduled for different transmission time intervals using the 15 available HSDPA OVSF codes. For a given TTI, each user equipment device 323-327 may be using one or more of the 15 HSDPA codes, depending on the downlink bandwidth allocated to the device during the TTI.

In a MIMO system, there are a certain number "N" of transmitter antennas by another number "M" of receiver antennas with corresponding signal paths from the transmit antennas and the receive antennas. The signals on these paths are not identical. MIMO creates multiple data transmission pipes. The pipes are orthogonal in the space-time domain. The number of pipes equals the rank of the system. Since these pipes are orthogonal in the space-time domain, they create little interference with each other. The data pipes are realized with proper digital signal processing by properly combining signals on the N×M paths. It is noted that a transmission pipe does not correspond to an antenna transmission chain or any one particular transmission path.

Communication systems may use a single carrier frequency or multiple carrier frequencies. Each link may incorporate a different number of carrier frequencies. Furthermore, an access terminal such as user equipment device 323-327 may be any data device that communicates through a wireless channel or through a wired channel, for example using fiber optic or coaxial cables. An access terminal such as user equipment 323-327 may be any of a number of types of devices including but not limited to PC card, compact flash, external or internal modem, or wireless or wireline phone. The access terminal is also known as user equipment (UE) 323-327, a remote station, a mobile station or a subscriber station. Also, the UE 323-327 may be mobile or stationary.

User equipment 323-327 that has established an active traffic channel connection with one or more Node Bs 310, 311, 314 is called active user equipment 323-327, and is said to be in a traffic state. User equipment 323-327 that is in the process of establishing an active traffic channel connection with one or more Node Bs 310, 311, 314 is said to be in a connection setup state. The communication link through which the user equipment 323-327 sends signals to the Node B 310, 311, 314 is called an uplink. The communication link through which Node B 310, 311, 314 sends signals to a user equipment 323-327 is called a downlink.

Figure 5:
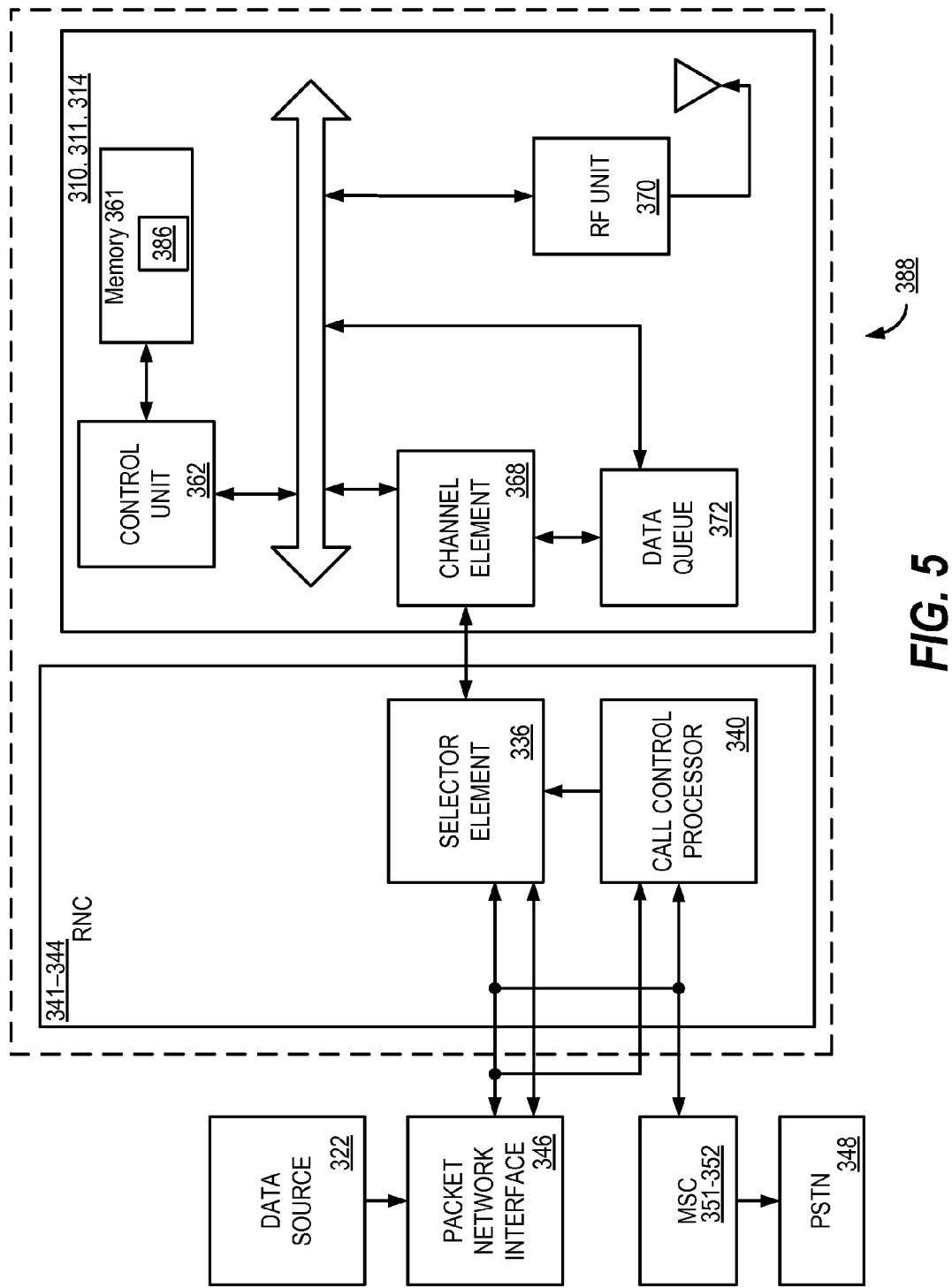
FIG. 5 is detailed herein below, wherein specifically, a base node (Node B) and radio network controller interface with a packet network interface; is a portion of a communication system, including a radio network controller and a Node B.

FIG. 5 is detailed herein below, wherein specifically, a Node B 310, 311, 314 and radio network controllers 341-344 interface with a packet network interface 346. (Note in FIG. 5, only one of the Nodes B 310, 311, 314 and only one of the RNCs 341-344 is shown for simplicity). The Node B 310, 311, 314 and radio network controller 341-344 may be part of a radio network server (RNS) 388, shown in FIG. 3 and in FIG. 5 as a dotted line surrounding one or more Node Bs 310, 311, 314 and the radio network controller 341-344. The associated quantity of data to be transmitted is retrieved from a data queue 372 in the Node B 310, 311, 314 and provided to the channel element 368 for transmission to the user equipment 323-327 associated with the data queue 372.

The radio network controller 341-344 interfaces with the Public Switched Telephone Network (PSTN) 348 through a mobile switching center 351, 352. Also, radio network controller 341-344 interfaces with Node Bs 310, 311, 314 in the communication network 300 (only one Node B 310, 311, 314 is shown in FIG. 4 for simplicity). In addition, the radio network controller 341-344 interfaces with a Packet Network Interface 346. The radio network controller 341-344 coordinates the communication between the user equipment 323-327 in the communication system and other users connected to packet network interface 346 and PSTN 348. The PSTN 348 interfaces with users through a standard telephone network (not shown in FIG. 5).

The radio network controller 341-344 contains many selector elements 336, although only one is shown in FIG. 5 for simplicity. Each selector element 336 is assigned to control communication between one or more Node Bs 310, 311, 314 and one remote station. If the selector element 336 has not been assigned to a given user equipment 323-327, a call control processor 340 is informed of the desire to page the user equipment 323-327. The call control processor 340 then directs the Node B 310, 311, 314 to page the user equipment 323-327.

Data source 322 contains a quantity of data, which is to be transmitted to a given user equipment 323-327. The data source 322 provides the data to the packet network interface 346. The packet network interface 346 receives the data and routes the data to the selector element 336. The selector element 336 then transmits the data to the Node B 310, 311, 314 in communication with the target user equipment 323-327. In one example, each Node B 310, 311, 314 maintains a data queue 372 which stores the data to be transmitted to the user equipment 323-327.

For each data packet, a channel element 368 inserts the necessary control fields. In one example, the channel element 368 performs a cyclic redundancy check (CRC), encoding of the data packet and control fields and inserts a set of code tail bits. The data packet, control fields, CRC parity bits, and code tail bits comprise a formatted packet. The channel element 368 then encodes the formatted packet and interleaves (or reorders) the symbols within the encoded packet. The interleaved packet is covered with a Walsh code, and spread with the short PNI and PNQ codes. The spread data is provided to RF unit 370 which quadrature modulates, filters, and amplifies the signal. The downlink signal is transmitted over the air through an antenna to the downlink.

At the user equipment 323-327, the downlink signal is received by an antenna and routed to a receiver. The receiver filters, amplifies, quadrature demodulates, and quantizes the signal. The digitized signal is provided to a demodulator (DEMOD) where the digitized signal is despread with the short PNI and PNQ codes and decovered with the Walsh cover. The demodulated data is provided to a decoder which performs the inverse of the signal processing functions done at the Node B 310, 311, 314, specifically the de-interleaving, decoding, and CRC check functions. The decoded data is provided to a data sink.

Figure 6:
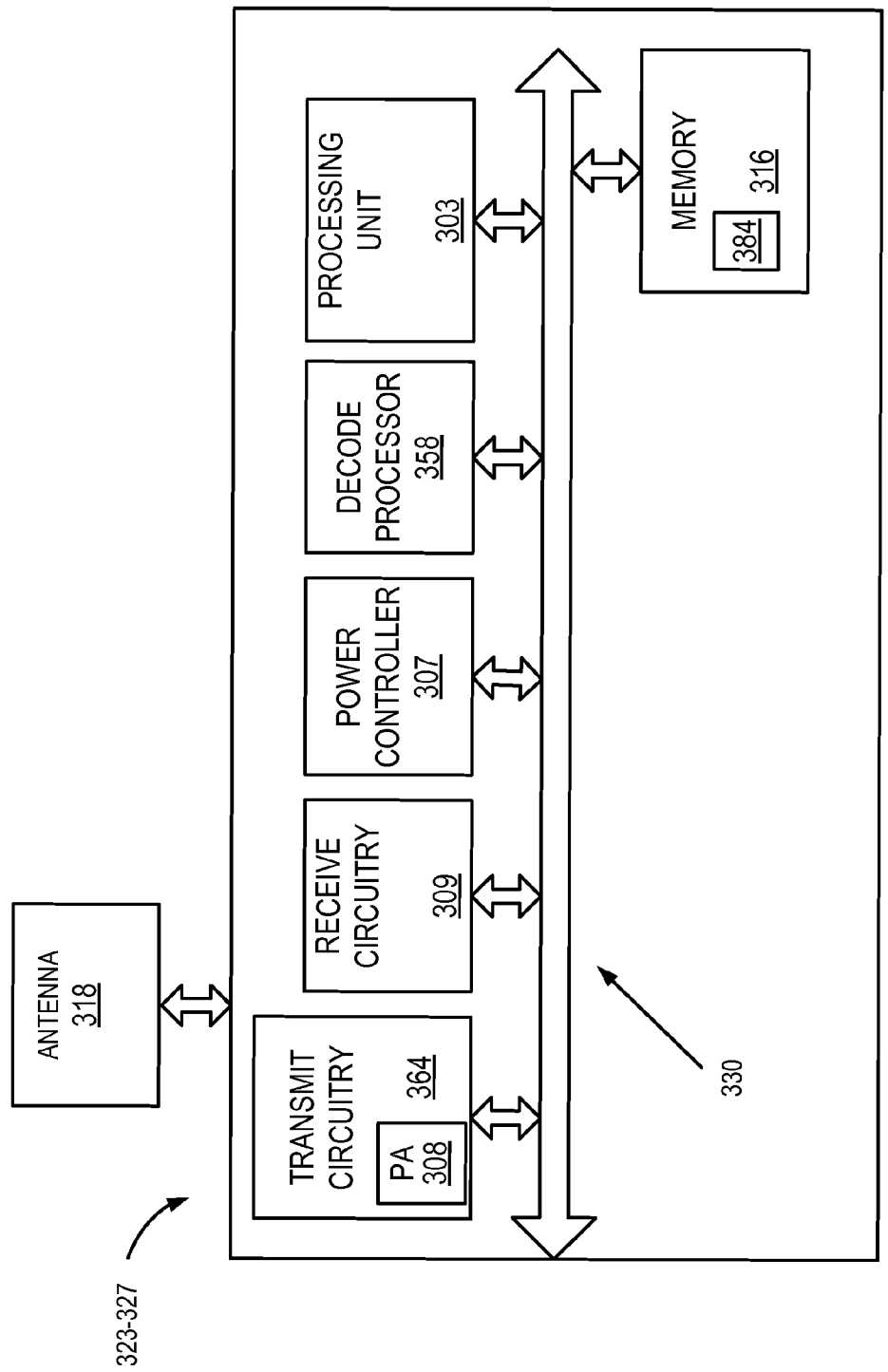
FIG. 6 is a block diagram of user equipment (UE)

FIG. 6 illustrates an example of a user equipment (UE) 323-327 in which the UE 323-327 includes transmit circuitry 364 (including PA 308), receive circuitry 309, power controller 307, decode processor 358, a processing unit 303 for use in processing signals, and memory 316. The transmit circuitry 364 and the receive circuitry 309 may allow transmission and reception of data, such as audio communications, between the UE 323-327 and a remote location. The transmit circuitry 364 and receive circuitry 309 may be coupled to an antenna 318.

The processing unit 303 controls operation of the UE 323-327. The processing unit 303 may also be referred to as a CPU. Memory 316, which may include both read-only memory (ROM) and random access memory (RAM), provides instructions and data to the processing unit 303. A portion of the memory 316 may also include non-volatile random access memory (NVRAM).

The various components of the UE 323-327 are coupled together by a bus system 330 which may include a power bus, a control signal bus, and a status signal bus in addition to a data bus. For the sake of clarity, the various buses are illustrated in FIG. 6 as the bus system 330.

The steps of the methods discussed may also be stored as instructions in the form of software or firmware 386 located in memory 361 in the Node B 310, 311, 314, as shown in FIG. 5. These instructions may be executed by the control unit 362 of the Node B 310, 311, 314 in FIG. 5. Alternatively, or in conjunction, the steps of the methods discussed may be stored as instructions in the form of software or firmware 384 located in memory 316 in the UE 323-327. These instructions may be executed by the processing unit 303 of the UE 323-327 in FIG. 6.

Figure 7:
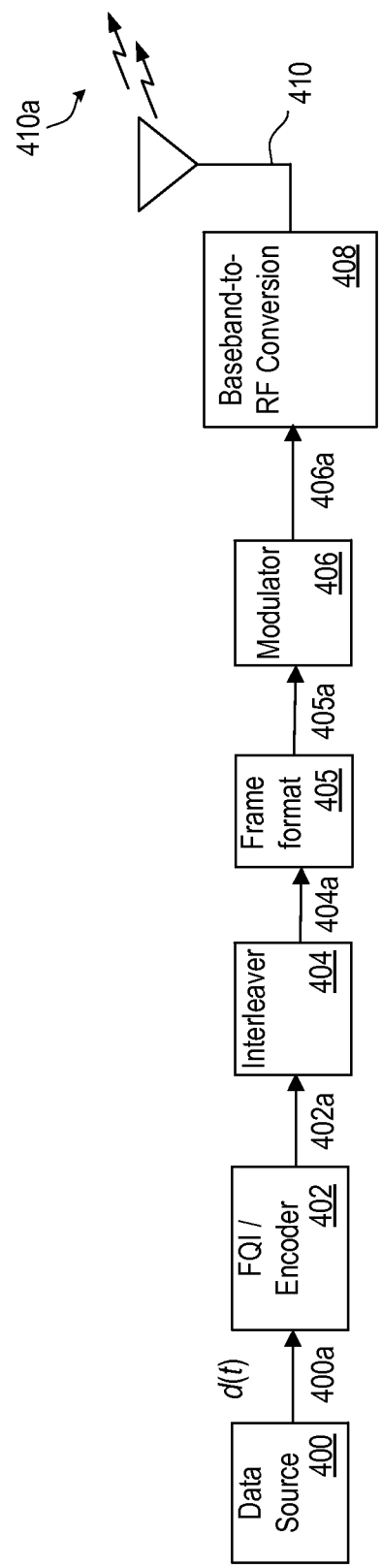
FIG. 7 is a functional block flow diagram of signals through structures of a transmitter.

FIG. 7 illustrates an example of a transmitter structure and/or process, which may be implemented, e.g., at user equipment 323-327. The functions and components shown in FIG. 7 may be implemented by software, hardware, or a combination of software and hardware. Other functions may be added to FIG. 7 in addition to or instead of the functions shown in FIG. 7.

In FIG. 7, a data source 400 provides data d(t) or 400a to a frame quality indicator (FQI)/encoder 402. The FQI encoder 402 may append an FQI such as a cyclic redundancy check (CRC) to the data d(t). The FQI/encoder 402 may further encode the data and FQI using one or more coding schemes to provide encoded symbols 402a. Each coding scheme may include one or more types of coding, e.g., convolutional coding, Turbo coding, block coding, repetition coding, other types of coding, or no coding at all. Other coding schemes may include automatic repeat request (ARQ), hybrid ARQ (H-ARQ), and incremental redundancy repeat techniques. Different types of data may be encoded with different coding schemes.

An interleaver 404 interleaves the encoded data symbols 402a in time to combat fading, and generates symbols 404a. The interleaved symbols of signal 404a may be mapped by a frame format 405 to a pre-defined frame format to produce a frame 405a. In an example, a frame format may specify the frame as being composed of a plurality of sub-segments. Sub-segments may be any successive portions of a frame along a given dimension, e.g., time, frequency, code, or any other dimension. A frame may be composed of a fixed plurality of such sub-segments, each sub-segment containing a portion of the total number of symbols allocated to the frame. For example, according to the W-CDMA standard, a sub-segment may be defined as a slot. According to the cdma2000 standard, a sub-segment may be defined as a power control group (PCG). In one example, the interleaved symbols 404a are segmented into a plurality S of sub-segments making up a frame 405a.

A frame format may further specify the inclusion of, e.g., control symbols (not shown) along with the interleaved symbols 404a. Such control symbols may include, e.g., power control symbols, frame format information symbols, etc.

A modulator 406 modulates the frame 405a to generate modulated data 406a. Examples of modulation techniques include binary phase shift keying (BPSK) and quadrature phase shift keying (QPSK). The modulator 406 may also repeat a sequence of modulated data.

A baseband-to-radio-frequency (RF) conversion block 408 may convert the modulated signal 406a to RF signals for transmission via an antenna 410 as signal 410a over a wireless communication link to one or more Node B station receivers.

Figure 8:
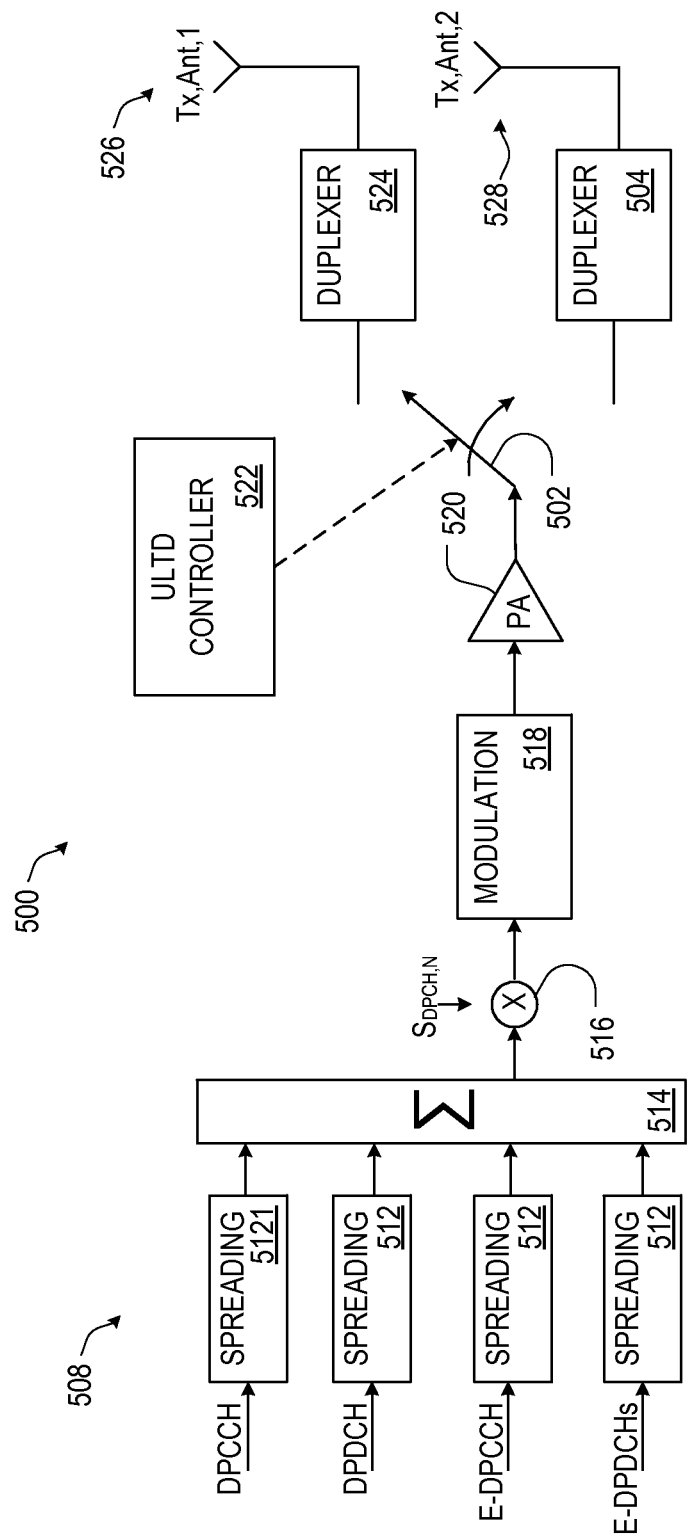
FIG. 8 is a block diagram of Switched Antenna Transmit Diversity (SATD) transmitter.

SATD Transmitter: In FIG. 8, a block diagram of a Switched Antenna Transmit Diversity (SATD) transmitter 500 is shown. As seen in FIG. 8, besides the introduction of a switch 502, an additional duplexer 504 and an additional transmit antenna 506 (referred to as secondary or diversity antenna) are added to a legacy UE 508 that transmits on a single antenna 510 only. In particular, Dedicated Physical Control Channel (DPCCH), Dedicated Physical Data Channel (DPDCH), Evolved Dedicated Physical Control Channel (E-DPCCH), and Evolved Dedicated Physical Data Channel (E-DPDCHs) are spread by respective spreading components 512 and combined at summer 514, mixed at mixer 516 with $S_{DPCH,N}$, and modulated by modulation component 518. After going through power amplifier 520, an ULTD controller 522 controls switch 502 to direct the signal to either first duplexer 524 or the additional duplexer 504 for transmission by respective Tx antenna 1 526 or Tx antenna 2 528.

Due to the introduction of an additional duplexer and additional transmit antenna in the SATD transmit chain, the present disclosure provides for testing all the UE Tx core requirements as defined in existing specifications on the primary antenna, only the Tx core requirements that are impacted by the additional second duplexer may be tested separately on the secondary or diversity antenna.

In other words, the present disclosure provides for statically configuring the UE to transmit on the primary transmit antenna, and test against all existing core Tx specifications. Further, the UE is statically configured to transmit on the secondary transmit antenna, and to be tested for a subset of existing Tx core specifications.

Next, additional Tx core specifications specific to SATD UEs are disclosed.

The present disclosure addresses antenna switching rate. In SATD, due to dynamic switching of the transmit antennas in the UE, there is a potential impact to the receiver of the Node B. In particular, at the point of switching antennas, there is amplitude and phase discontinuity induced in the channel, since the channel impulse responses between each of the UE transmit antennas and the receive antennas of the Node B are in general independent. This in turn could potentially impact the channel estimation sub-system in the Node B receiver leading to an increase in pilot (DPCCH) SNR operating point.

With SATD, there may be a sensitivity of the Node B receiver loss to the antenna switching rate. One method and apparatus for addressing the sensitivity in SATD devices is to limit the transmit antenna switching rate in terms of the number of antenna switches per second (for example, twenty (20) antenna switches per second). That is, for a SATD capable UE, ensure that the transmit antenna switching rate does not exceed an upper limit or threshold.

Figure 9:
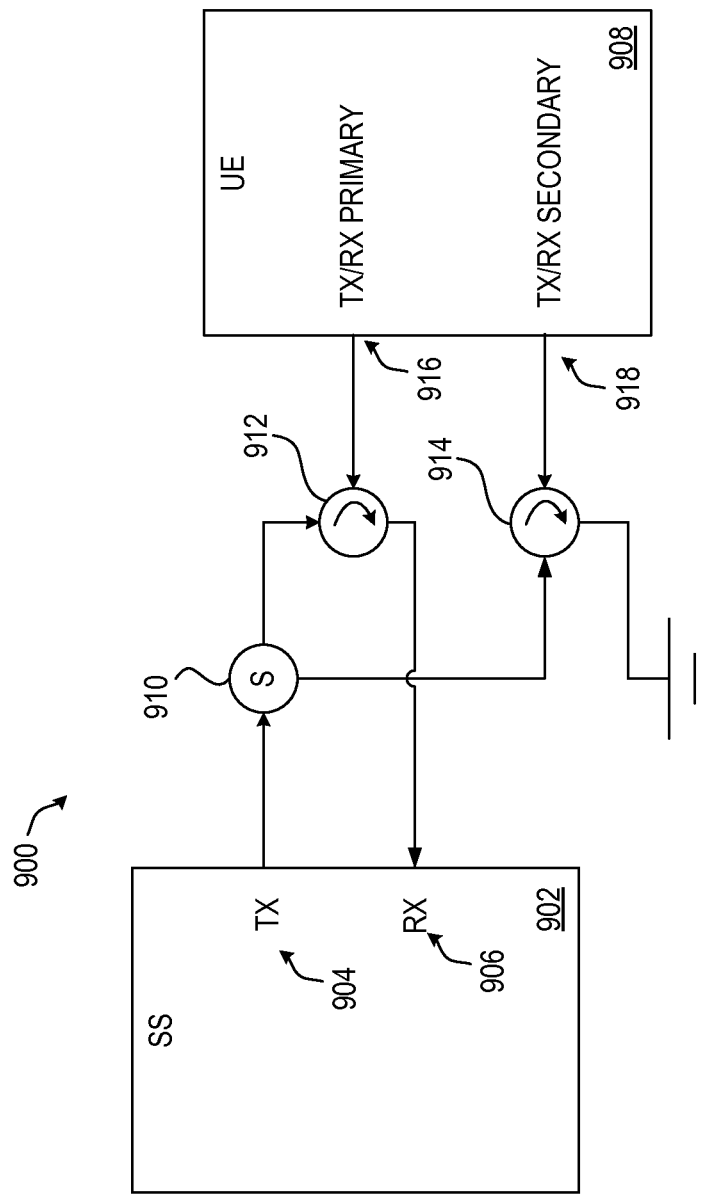
FIG. 9 discloses a test setup which may be used to test and verify an antenna switching rate in SATD devices.

A test setup 600 shown in FIG. 9 may be used to test and verify antenna switching rate in SATD devices. At a high level, the test setup 600 can be summarized as a System Simulator (SS) 602, having a transmitter (TX) 604 and a receiver (RX) 606. The SS 602 sets up a call with a UE 608 that is under test via TX 604. Once the UE 608 is in CELL_DCH, SS 602 sends a dummy pattern of Transmit Power Control (TPC) bits to UE 608. In particular, a switch ("S") 610 selects between a first transceiver 612 and a second transceiver 614 that couple respectively with a primary TX/RX 616 and a secondary TX/RX 618 of UE 608. A choice of dummy TPC pattern can be determined based on collecting traces of TPC bits from a link simulation. SS 602 detects when an antenna switch happens by sensing the absence or presence of a signal at its receiver RX 606.

UE 608 may be transmitting at a sufficiently high power to allow for the SS 602 to detect its absence.

When the UE 608 switches to the secondary or diversity antenna (secondary TX/RX 618), there is no connection with the RX 606 of the SS 602.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 10:
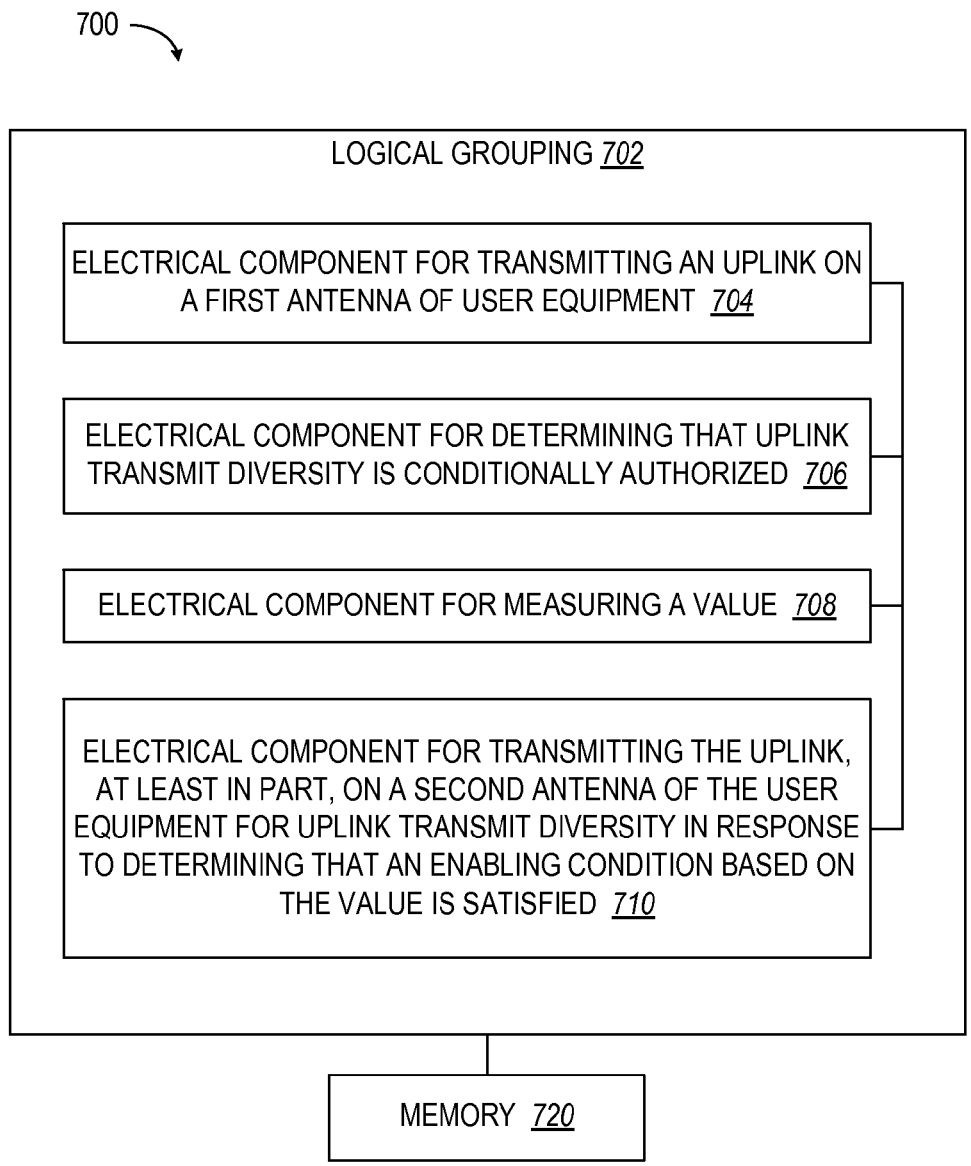
FIG. 10 is a schematic diagram of a system of logical grouping of electrical components for conditionally performing ULTD.

With reference to FIG. 10, illustrated is a system 700 for conditional uplink transmit diversity. For example, system 700 can reside at least partially within user equipment. It is to be appreciated that system 700 is represented as including functional blocks, which can be functional blocks that represent functions implemented by a computing platform, processor, software, or combination thereof (e.g., firmware). System 700 includes a logical grouping 702 of electrical components that can act in conjunction. For instance, logical grouping 702 can include an electrical component 704 for transmitting an uplink on a first antenna of user equipment. For another instance, logical grouping 702 can include an electrical component 706 for determining that uplink transmit diversity is conditionally authorized. For an additional instance, logical grouping 702 can include an electrical component 708 for measuring a value. For a further instance, logical grouping 702 can include an electrical component 710 for transmitting the uplink, at least in part, on a second antenna of the user equipment for uplink transmit diversity in response to determining that an enabling condition based on the value is satisfied. Additionally, system 700 can include a memory 720 that retains instructions for executing functions associated with electrical component 704-710. While shown as being external to memory 720, it is to be understood that one or more of electrical component 704-710 can exist within memory 720.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for uplink transmit diversity, comprising:
    transmitting, by a user equipment (UE), an uplink on a first antenna of the UE;
    determining that a serving node has conditionally authorized uplink transmit diversity;
    measuring a value; and
    transmitting, by the UE, the uplink, at least in part, on a second antenna of the UE for uplink transmit diversity in response to determining that the serving node has conditionally authorized uplink transmit diversity and determining that an enabling condition based on the value is satisfied.

2. The method of claim 1, further comprising determining by the user equipment that uplink transmit diversity is conditionally authorized.

3. The method of claim 1, further comprising measuring the value by the user equipment.

4. The method of claim 1, further comprising determining by a serving node that uplink transmit diversity is conditionally authorized.

5. The method of claim 1, further comprising measuring the value by a serving node.

6. The method of claim 1, further comprising transmitting the uplink at least in part on the second antenna for Switched Antenna Transmit Diversity (SATD).

7. The method of claim 6, further comprising:
    wherein measuring the value comprises determining a value of time elapsed since switching between transmitting on the first antenna and the second antenna; and
    enabling switching between the first antenna and the second antenna in response to comparing the value of time elapsed to the enabling condition of a minimum elapsed time threshold.

8. The method of claim 7, wherein the enabling condition prevents switching between the first antenna and the second antenna more than a configurable value.

9. The method of claim 6, further comprising disabling switching between the first antenna and the second antenna for Switched Antenna Transmit Diversity (SATD) in response to determining that the user equipment is configured for Dual Carrier High-Speed Uplink Packet Access (DC-HSUPA).

10. The method of claim 1, further comprising transmitting the uplink at least in part on a second antenna for Beamforming Transmit Diversity (BFTD).

11. The method of claim 10, further comprising disabling BFTD in response to determining that the user equipment is configured for Dual Carrier High-Speed Uplink Packet Access (DC-HSUPA).

12. The method of claim 1, wherein determining that the enabling condition based on the value is satisfied further comprises comparing the value comprising power headroom of the user equipment to an enabling threshold.

13. The method of claim 1, wherein determining that the enabling condition based on the value is satisfied further comprises comparing the value comprising an active set size of the user equipment to an active set threshold.

14. The method of claim 13, wherein the active set threshold is one (1).

15. The method of claim 1, wherein determining that the enabling condition based on the value is satisfied further comprises comparing the value comprising Common Pilot Channel (CPICH) Received Signal Code Power (RSCP) to an enabling threshold.

16. The method of claim 1, wherein determining that the enabling condition based on the value is satisfied further comprises comparing the value comprising Universal Mobile Telecommunications System (UMTS) Terrestrial Radio Access (UTRA) carrier Received Signal Strength Indication (RSSI) to an enabling threshold.

17. The method of claim 1, wherein determining that the enabling condition based on the value is satisfied further comprises comparing the value comprising Chip Energy divided by Noise Density (Ec/No) of a downlink from a serving node to an enabling threshold.

18. The method of claim 1, further comprising determining that the enabling condition based on the value is satisfied further comprises comparing the value comprising transmit power by the user equipment to an enabling threshold.

19. The method of claim 18, wherein the determining that the enabling condition is satisfied further comprises determining that only a W-CDMA Release 1999 Dedicated Channel (DCH) is configured on the user equipment.

20. The method of claim 1, wherein determining that the enabling condition based on the value is satisfied further comprises comparing the value comprising speed of the user equipment to an enabling threshold.

21. The method of claim 1, wherein determining that the enabling condition based on the value is satisfied further comprises comparing the value comprising distance of the user equipment from a serving node to an enabling threshold.

22. The method of claim 1, wherein determining that the enabling condition based on the value is satisfied further comprises comparing the value comprising an average data rate transmitted by the user equipment to an enabling threshold.

23. The method of claim 1, wherein determining that the enabling condition based on the value is satisfied further comprises comparing the value comprising duration of a Radio Resource Management (RRM) operation to an enabling threshold.

24. The method of claim 1, wherein determining that the enabling condition based on the value is satisfied further comprises comparing the value comprising duration of an interference management operation to an enabling threshold.

25. The method of claim 1, wherein determining that the enabling condition based on the value is satisfied further comprises comparing the value comprising a traffic characteristic of a served plurality of user equipment to an enabling threshold.

26. The method of claim 1, wherein determining that the enabling condition is satisfied further comprises comparing the value comprising a number of antenna switches within a selected amount of time to an enabling threshold.

27. The method of claim 1, further comprising disabling uplink transmit diversity in response to determining that a disabling condition based on the value is satisfied, wherein the disabling condition comprises a disabling threshold that equals the enabling condition comprising an enabling threshold with a threshold adjustment for hysteresis.

28. An apparatus for uplink transmit diversity, comprising:
means for transmitting, by a user equipment (UE), an uplink on a first antenna of the UE;
means for determining that a serving node has conditionally authorized uplink transmit diversity;
means for measuring a value; and
means for transmitting, by the UE, the uplink, at least in part, on a second antenna of the UE for uplink transmit diversity in response to determining that the serving node has conditionally authorized uplink transmit diversity and determining that an enabling condition based on the value is satisfied.

29. An apparatus for uplink transmit diversity, comprising:
a transmitter for transmitting, by a user equipment (UE), an uplink on a first antenna;
an uplink transmit diversity controller for determining that a serving node has conditionally authorized uplink transmit diversity;
a receiver for measuring a value; and
the transmitter further for transmitting, by the UE, the uplink, at least in part, on a second antenna of the user equipment for uplink transmit diversity in response to the uplink transmit diversity controller for determining that the serving node has conditionally authorized uplink transmit diversity and determining that an enabling condition based on the value is satisfied.

* * * * *